United States Patent [19]
Snyder et al.

[11] Patent Number: 6,009,168
[45] Date of Patent: *Dec. 28, 1999

[54] HOLDER FOR A PORTABLE ELECTRONIC DEVICE

[75] Inventors: Michael Thomas Snyder, Chicago; John Francis Hannon, Gurnee; Scott Michael Kouri, Chicago., all of Ill.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/719,055

[22] Filed: Sep. 24, 1996

[51] Int. Cl.⁶ ................................................. H04M 1/00
[52] U.S. Cl. ................................. 379/446; 379/455
[58] Field of Search ........................ 379/426, 446, 379/455, 454, 420, 428; 455/575, 90, 128, 346, 347

[56] References Cited

U.S. PATENT DOCUMENTS

| | | |
|---|---|---|
| D. 361,979 | 9/1995 | Shirakawa et al. . |
| 3,999,110 | 12/1976 | Ramstrom et al. . |
| 4,741,034 | 4/1988 | Errichiello et al. . |
| 4,892,486 | 1/1990 | Guzik et al. . |
| 4,904,549 | 2/1990 | Goodwin et al. . |
| 4,963,812 | 10/1990 | Mischenko et al. . |
| 5,020,090 | 5/1991 | Morris . |
| 5,030,902 | 7/1991 | Mattinger et al. . |
| 5,059,885 | 10/1991 | Weiss et al. . |
| 5,113,436 | 5/1992 | Jarvela et al. . |
| 5,187,744 | 2/1993 | Richter . |
| 5,189,358 | 2/1993 | Tomura et al. . |
| 5,253,292 | 10/1993 | Fluder et al. . |
| 5,256,955 | 10/1993 | Tomura et al. . |
| 5,463,688 | 10/1995 | Wijas . |
| 5,478,037 | 12/1995 | Haltof . |
| 5,480,115 | 1/1996 | Haltof . |
| 5,604,050 | 2/1997 | Brunette et al. . |

FOREIGN PATENT DOCUMENTS

| | | |
|---|---|---|
| 0506439 A1 | 9/1992 | European Pat. Off. . |
| 0701357 A2 | 3/1996 | European Pat. Off. . |
| 331543 | 11/1992 | Japan ..................................... 379/428 |
| 371051 | 12/1992 | Japan ..................................... 379/428 |
| 6-37875 | 2/1994 | Japan ..................................... 379/426 |
| 2245437 | 1/1992 | United Kingdom . |
| WO 97/00792 | 1/1997 | WIPO . |

OTHER PUBLICATIONS

SEIL Communications, "Wireless Accessories!", one page.

*Primary Examiner*—Jack Chiang
*Attorney, Agent, or Firm*—John J. Oskorep

[57] ABSTRACT

A holder (100) for a portable electronic device (600) comprises a mountable housing (102), a latching mechanism (104), and an electrical connector (101). The portable electronic device (600) has a bottom surface (608) defining a slot (800) and a front edge (610) including an electrical connector (624). The mountable housing (102) has a first end (151) and a second end (153). The latching mechanism (104) is movably disposed on the first end (151) and includes a biasing element exerting a force on the latching mechanism (104) in a direction towards the second end (153). The electrical connector (101) is positioned on the second end (153) and includes electrical contacts facing the first end (151). When the portable electronic device (600) is properly inserted within the holder (100), the latching mechanism (104) engages the slot (800) for securing the portable electronic device (600) within the holder (100) and for establishing and maintaining an electrical connection between electrical connectors (101, 624).

18 Claims, 4 Drawing Sheets

HOLDER FOR A PORTABLE ELECTRONIC DEVICE

FIELD OF THE INVENTION

The present invention relates generally to holders of portable electronic devices, and more particularly to hangup cups for radiotelephones.

BACKGROUND OF THE INVENTION

Portable communication devices, such as cellular telephones, have provided convenient communications for users in various remote locations. Typically, when such communication is desired in an automobile, a hands-free communication system including a hangup cup is used. During communication, the hangup cup holds the portable communication device while the user speaks into an auxiliary microphone and listens from an auxiliary speaker. Of course, it is important that the hangup cup holds the portable communication device securely and that any electrical connections established therebetween are also reliably secured. This is particularly true when considering the environment of an automobile, where the hangup cup may be subjected to sharp and sudden movements and vibrations.

When entering and leaving an automobile, a user typically inserts and removes the portable communication device within and from the hangup cup. Unfortunately, conventional hangup cups have not provided simple methods for inserting and removing a portable communication device since such simpler methods tend to compromise the secure attachment required.

Accordingly, what is needed is a holder that provides a simple method for inserting and removing a portable electronic device while providing a reliable grip and electrical connection to the portable electronic device when inserted therein. It is also beneficial if such a holder can be adapted to a variety of portable electronic devices.

DETAILED DESCRIPTION OF THE PREFERRED EMBODIMENTS

According to the present invention, a holder for a portable electronic device comprises a mountable housing, a latching mechanism, and an electrical connector. The portable electronic device has a bottom surface defining a slot and a front edge including an electrical connector. The mountable housing has a first end and a second end. The latching mechanism is movably disposed on the first end and includes a biasing element exerting a force on the latching mechanism in a direction towards the second end. The electrical connector of the holder is positioned on the second end and includes electrical contacts facing the first end. When the portable electronic device is properly inserted within the holder, the latching mechanism engages the slot for securing the portable electronic device within the holder and for establishing and maintaining an electrical connection between the electrical connectors.

Figure 1:
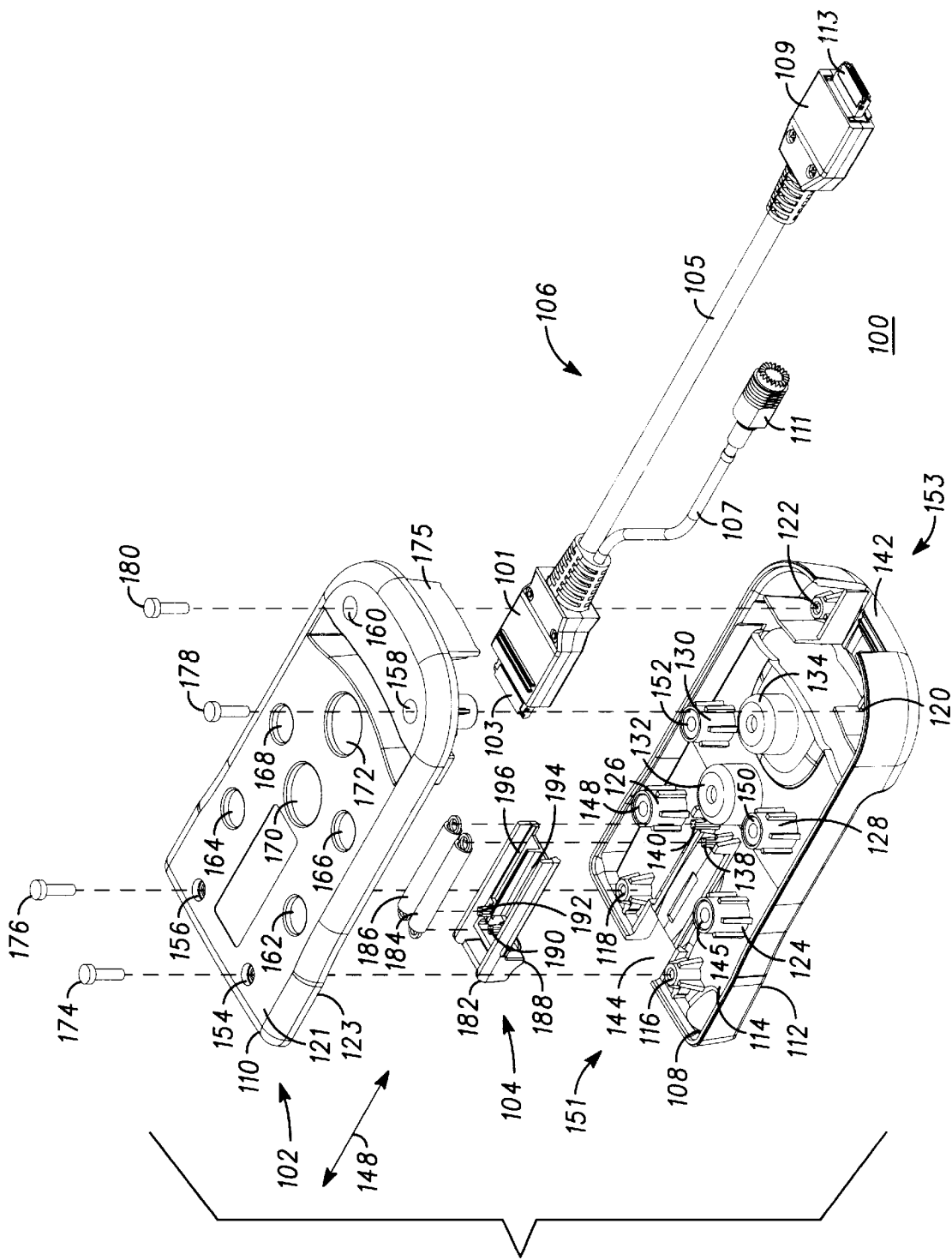
FIG. 1 is an exploded bottom view of a holder in accordance with the present invention, the holder comprising a housing, a latching mechanism, and a connector cord.

FIG. 1 is an illustration showing a exploded bottom view of a holder 100 in accordance with the present invention. Holder 100 comprises a mountable housing 102, a latching mechanism 104, and a connector cord 106. Mountable housing 102 has a first end 151 and a second end 153, and includes a top portion 108, a bottom portion 110, and attachment screws 174, 176, 178, and 180.

Top portion 108 forms a top surface 112 (not fully visible in FIG. 1) of mountable housing 102 and an inner surface 114. Inner surface 114 is integrally molded to define bored attachment bosses 116, 118, 120, and 122, bored mounting bosses 124, 126, 128, and 130, bulkhead mount wells 132 and 134, a track 136, and spring pins 138 and 140. Top portion 108 also defines a latch opening 144 on first end 151 and a connector opening 142 on second end 153. Bored mounting bosses 124, 126, 128, and 130 each have internally threaded elements 146, 148, 150, and 152 disposed and attached therein. Track 136 is longitudinally oriented along top portion 108 and has one end leading to latch opening 144 and another end leading to spring pins 138 and 140.

Bottom portion 110 has an inner surface 123 (not fully visible) and forms a bottom surface 121 of mountable housing 102. Bottom portion 110 defines attachment holes 154, 156, 158, and 160, mounting holes 162, 164, 166, and 168, mounting well holes 170 and 172, and a connector rib 175 on second end 153. Bored attachment bosses 116, 118, 120, and 122 and attachment holes 154, 156, 158, and 160 are sized and positioned to respectively align when top portion 108 and bottom portion 110 are assembled. As the dashed lines in FIG. 1 show, top portion 108 and bottom portion 110 may be attached using attachment screws 174, 176, 178, and 180. Attachment screws 174, 176, 178, and 180 insert through attachment holes 154, 156, 158, and 160, respectively, and threadedly attach within bored attachment bosses 116, 118, 120, and 122, respectively.

Bored mounting bosses 124, 126, 128, and 130 align with and are sized to fit within mounting holes 162, 164, 166, and 168, respectively. Bored mounting bosses 124, 126, 128, and 130 protrude through mounting holes 162, 164, 166, and 168, respectively, until top surfaces of bored mounting bosses 124, 126, 128, and 130 are generally flush with bottom surface 121. Bored mounting bosses 124, 126, 128, and 130 each have ribs positioned therearound for engaging inner surface 123 to add strength to mountable housing 102 when assembled.

Bulkhead mount wells 132 and 134 also align with and are sized to fit within mounting well holes 170 and 172, respectively. Here, bulkhead mount wells 132 and 134 protrude through mounting well holes 170 and 172, respectively, until top surfaces of bulkhead mount wells 132 and 134 are generally flush with bottom surface 121.

Figure 2:
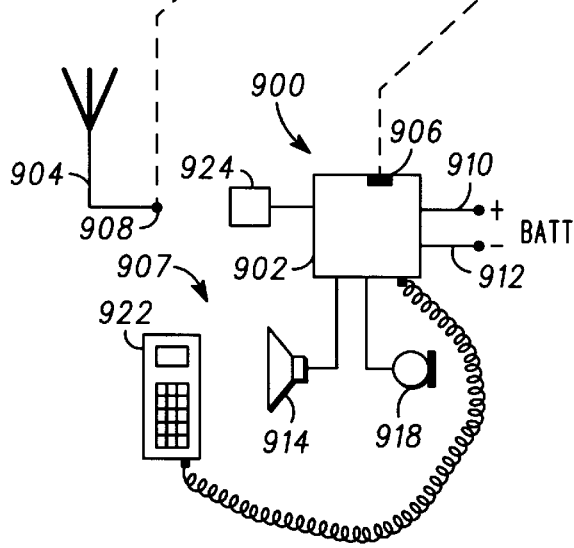
FIG. 2 is the latching mechanism viewed from an inner surface of a top portion of the housing.
Figure 2:
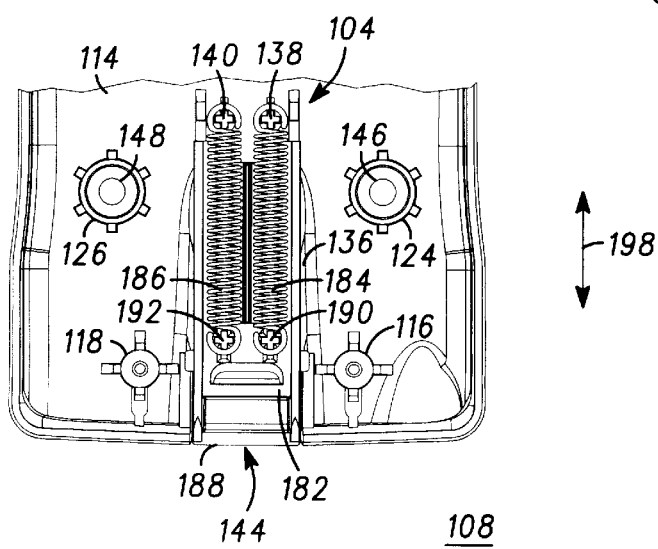

Latching mechanism 104 includes a latch member 182, a spring 184, and a spring 186. Latch member 182 has an elongated body defining a catch 188, a spring pin 190, a spring pin 192, a channel 194, and a channel 196. During the assembly of holder 100, latch member 182 is placed on track 136 where a portion of latch member 182, which includes catch 188, is disposed within latch opening 144. Springs 184 and 186 are disposed within channels 194 and 196, respectively. One end of spring 184 is attached to spring pin 190 and, after spring 184 is extended, the other end of spring 184 is attached to spring pin 138. Likewise, one end of spring 186 is attached to spring pin 192 and, after spring 186 is extended, the other end of spring 186 is attached to spring pin 140. FIG. 2 shows a frontal view of a portion of inner surface 114 with latching mechanism 104 assembled therein.

As described below, latch member 182 is capable of moving along track 136 in the directions indicated by an arrow 198 in FIGS. 1 and 2. Inner surface 123 of bottom portion 110 also includes a track (not visible) similar to track 136 which, when top portion 108 and bottom portion 110 are assembled, engages track 136 and assists in guiding latch member 182 in the directions indicated by arrow 198.

Referring back to FIG. 1, connector cord 106 includes an electrical connector 101 having a connector head 103, an electrical connector 109 having a connector head 113, an electrical connector 111, a cord 105, and a cord 107. Electrical connectors 101, 109, and 111 each have electrical contacts (not visible) which are outwardly exposed for mating and making electrical contact with other corresponding electrical connectors. Some of the electrical contacts of connector head 103 are electrically coupled to some of the electrical contacts of connector head 113 through electrical conductors disposed within cord 105. Likewise, some of the electrical contacts of connector head 103 are electrically coupled to the electrical contacts of electrical connector 111 through electrical conductors disposed within cord 107. When holder 100 is assembled, electrical connector 101 is disposed within connector opening 142 and captured by connector rib 175.

Figure 3:
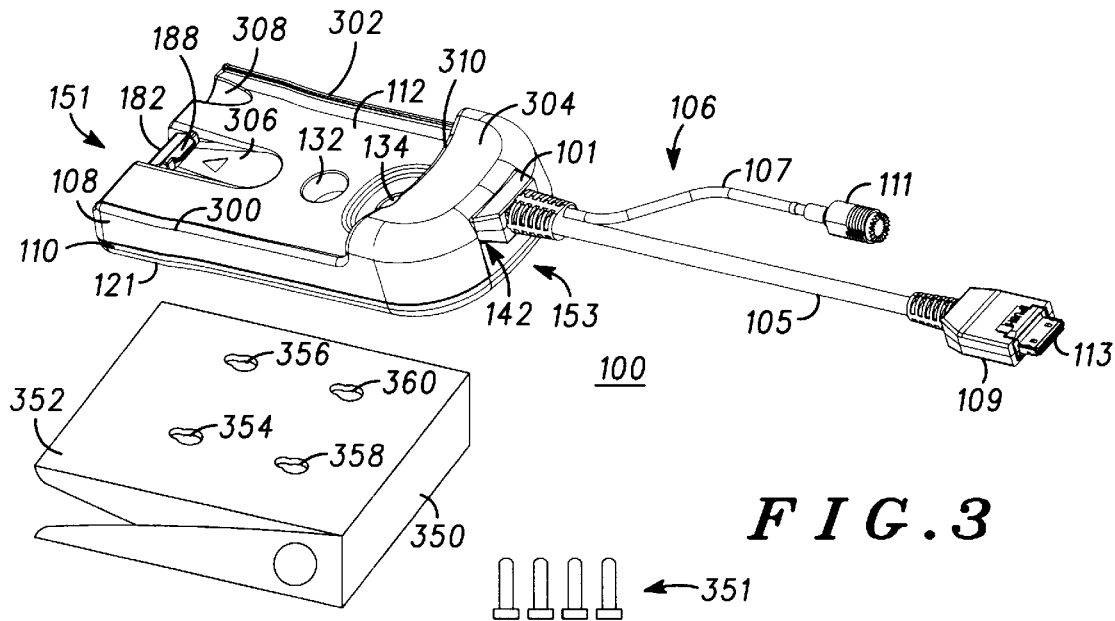
FIG. 3 is a first isometric view of the holder and a mounting bracket, where the holder is fully assembled and the latching mechanism is in a non-extended position.
Figure 4:
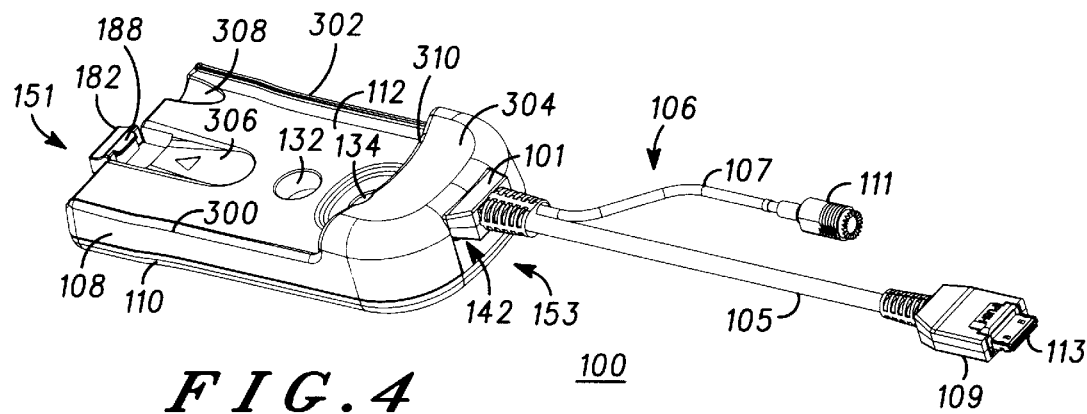
FIG. 4 shows the holder with the latching mechanism in an extended position.
Figure 5:
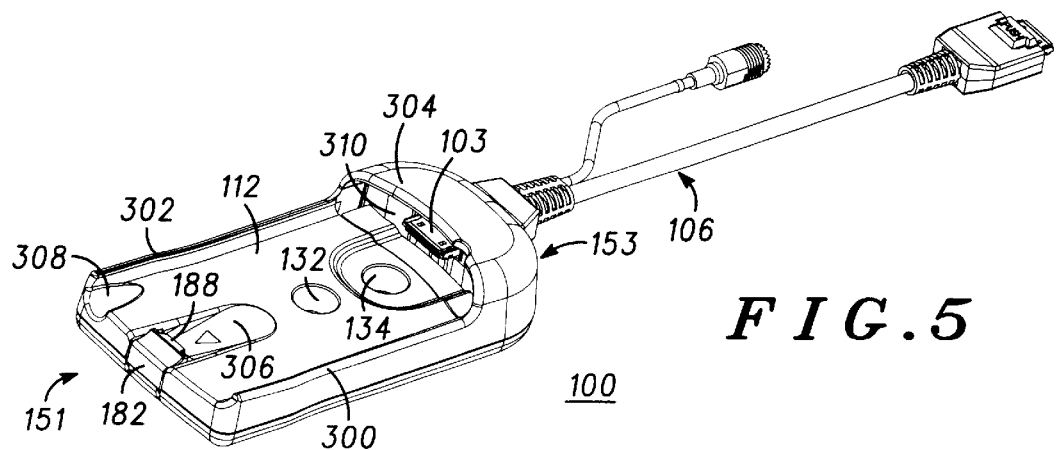
FIG. 5 shows a second isometric view of the holder.

FIGS. 3, 4, and 5 show holder 100 when fully assembled. In addition, FIGS. 3, 4, and 5 show additional features of top surface 112, namely, a guide rail 300, a guide rail 302, a cup 304, a recess 306, and a recess 308. Such additional features assist in defining a shape of top surface 112 that substantially conforms to a shape of a bottom surface of a portable electronic device, described later in FIGS. 6–8. Preferably, mountable housing 102 is manufactured from plastic, where top surface 112 forms a hard but smooth surface.

Guide rails 300 and 302 are defined along outer edges of top portion 108. Cup 304 is defined on second end 153 and has an opening 310 facing first end 151 in a plane perpendicular to top surface 112. Recess 306 is formed on first end 151 in an area approximately defined by latch member 182 disposed therebeneath. Recess 308 is also formed on first end 151 and along a portion of guide rail 302. Recesses 306 and 308 are defined having a downward slope from a center of top surface 112 towards first end 151. FIG. 5 shows that connector head 103 protrudes through a bottom of cup 304 when holder 100 is assembled.

Latching mechanism 104 may be placed in a non-extended position, as shown in FIG. 3, or in several extended positions, such as an extended position shown in FIG. 4. As latching mechanism 104 is drawn outward to such an extended position, forces from springs 184 and 186 (FIGS. 1 and 2) tend to urge latch member 182 inward towards the non-extended position. Of course, latching mechanism 104 may include any biasing element that provides a force inwardly towards second end 153.

Holder 100 is designed to be mounted, and more particularly, is designed to be mounted to the inside of an automobile. FIG. 3 shows a mounting bracket 350 and mounting screws 351, both of which are typically used for mounting holder 100. Mounting bracket 350 includes a surface 352 having mounting holes 354, 356, 358, and 360. Bottom surface 121 of holder 100 is placed on surface 352, where mounting screws 351 insert within mounting holes 354, 356, 358, and 360 to threadedly attach within bored mounting bosses 124, 126, 128, and 130 (FIG. 1). Preferably, internally threaded elements 146, 148, 150, and 152 are made of brass for durability and are ultrasonically welded to the insides of mounting bosses 124, 126, 128, and 130, respectively.

Alternatively, using bulkhead mount wells 132 and 134 (FIG. 1), holder 100 may be mounted to other surfaces using other available fastening means (e.g., nails or screws). Here, such fastening means are penetrated through bulkhead mount wells 132 and 134 from top surface 112 and through mounting well holes 170 and 172 for attachment. It is also realized that holder 100 may be detachably mounted, where a user may easily detach holder 100 when desired.

Figure 6:
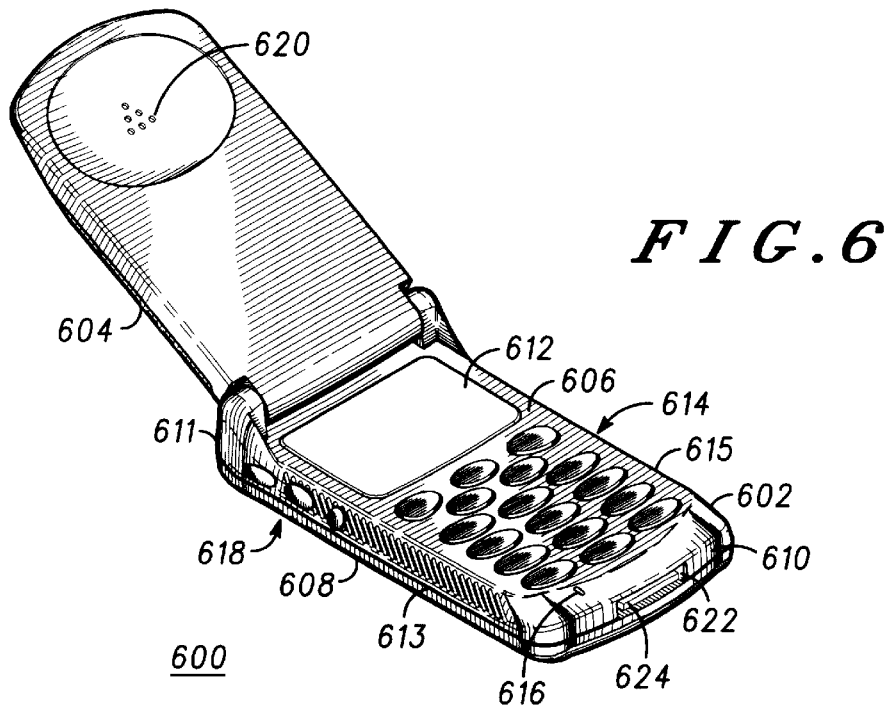
FIG. 6 shows a front isometric view of a portable electronic device having a cover element in an open position.
Figure 7:
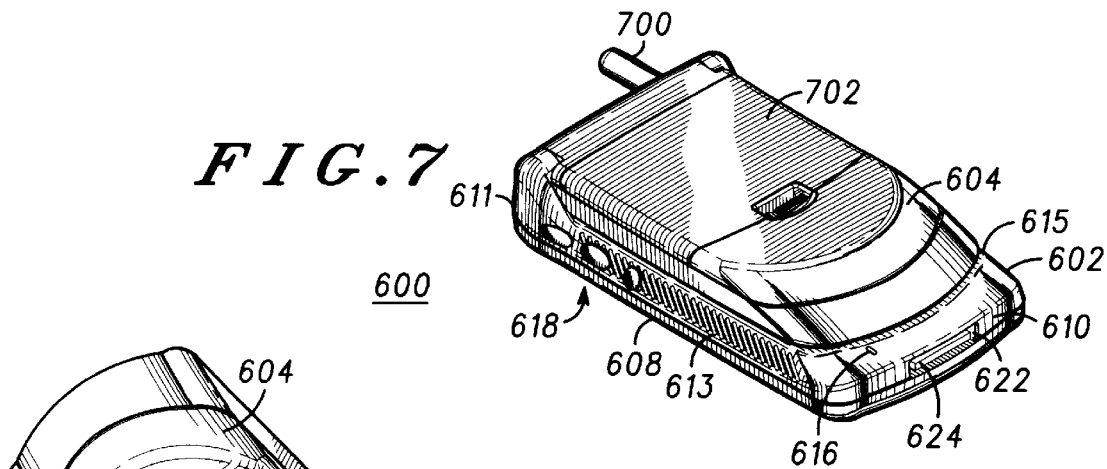
FIG. 7 shows the portable electronic device having the cover element in a closed position.
Figure 8:
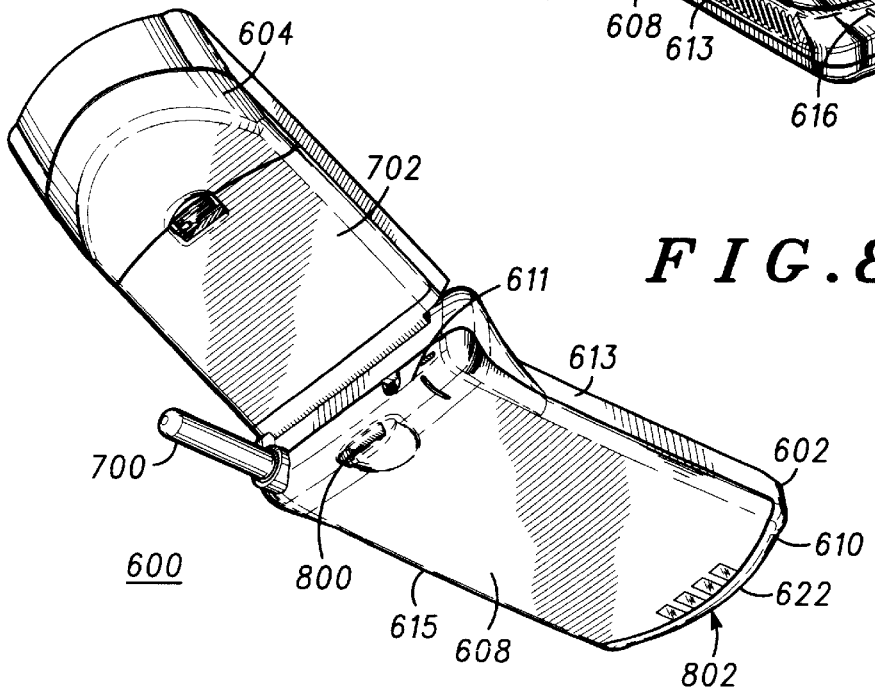
FIG. 8 is a rear isometric view of the portable electronic device.

FIGS. 6, 7, and 8 show a portable electronic device 600 that may be held by holder 100. In this embodiment, portable electronic device 600 is a radiotelephone which may be used for cellular telephone communications. When used with a radiotelephone, holder 100 may be more commonly referred to as a hangup cup. Portable electronic device 600 includes a body 602 and a cover element 604. Body 602 has a top surface 606, a bottom surface 608, a front edge 610, a back edge 611, a side edge 613, and a side edge 615.

Referring more particularly to FIG. 6, portable electronic device 600 is shown with cover element 604 in an open position. Portable electronic device 600 includes a display 612, a keypad 614, and a microphone 616 disposed along top surface 606 of body 602. Portable electronic device 600 includes keys 618 along side edge 613, and a speaker 620 disposed within cover element 604. Along front edge 610, body 602 defines an opening 622 where an electrical connector 624 is exposed. Opening 622 is defined by a plane perpendicular to top surface 606 and facing opposite back edge 611. Electrical connector 624 has electrical contacts (not fully visible) coupled to electrical circuitry disposed within body 602 and cover element 604. The electrical contacts are outwardly exposed within opening 622 for making electrical contact with electrical contacts of electrical connector 101, as described below.

FIG. 7 shows portable electronic device 600 with cover element 604 in a closed position, and FIG. 8 shows a rear isometric view of portable electronic device 600 with cover element 604 in the open position. In these figures, portable electronic device 600 is shown to include an antenna 700, a battery 702, and battery contacts 802. In addition, bottom surface 608 includes a raised portion defining a slot 800 near back edge 611. Slot 800 has an opening facing opposite front edge 610 and defined by a plane perpendicular to bottom surface 608. Battery contacts 802 may be used for charging battery 702 and for adding an auxiliary battery (not shown) to portable electronic device 600.

Figure 9:
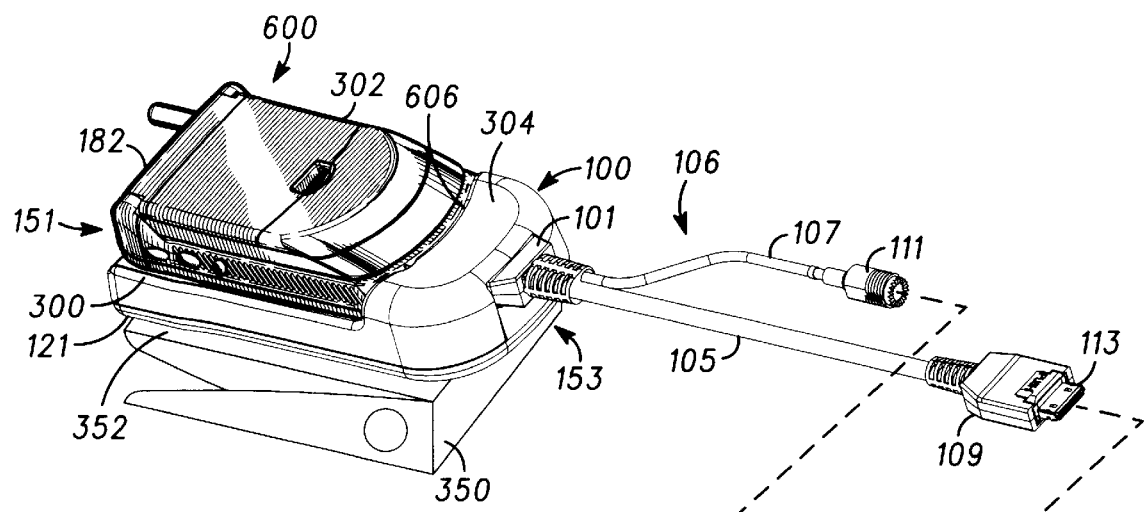
FIG. 9 shows the holder mounted to a mounting bracket and holding the portable electronic device.

FIG. 9 shows holder 100 horizontally mounted on mounting bracket 350 and portable electronic device 600 properly inserted and held within holder 100. FIG. 9 also shows a hands-free communication system 900 that may be used in conjunction with holder 100. Hands-free communication system 900 is suitable for use in a vehicle such as an automobile. Hands-free communication system 900 comprises an interface box 902, an antenna 904, and accessories 907. Interface box 902 has electrical circuitry disposed therein for managing and controlling data and control signals between portable electronic device 600 and hands-free communication system 900. Interface box 902 includes an electrical connector 906 for coupling to electrical connector 109, and electrical conductors 910 and 912 for coupling to a car battery (not shown) for supplying power to the electrical circuitry of interface box 902 and portable electronic device 600. Antenna 904 is typically mounted outside of the automobile, and includes an electrical connector 908 for coupling to electrical connector 111. Since cord 107 is used strictly for carrying radio frequency (RF) signals, it results in relatively little signal loss to and from antenna 904. Accessories 907 include a speaker 914, a microphone 918, an auxiliary handset 922 (optional), and a signal booster 924 (optional), each of which are coupled to interface box 902. In a typical application, a user may hold a telephone conversation by listening to speaker 914 and talking in microphone 918 or, alternatively, by simply using auxiliary handset 922. Signal booster 924 is optionally provided to increase the gain of the RF signals transmitted from antenna 904.

The following description is a preferred method for inserting portable electronic device 600 within holder 100, as shown in FIG. 9. The reader is directed to refer generally to FIGS. 3, 7, and 8 in combination. Portable electronic device 600 is gripped firmly by side edges 613 and 615 and positioned above holder 100 such that back edge 611 and front edge 610 align with first end 151 and second end 153, respectively, and bottom surface 608 and top surface 112 face and lie parallel to one another. Next, portable electronic device 600 is tilted downwardly such that back edge 611 abuts top surface 112 at a location near first end 151, where side edges 613 and 615 are confined within guide rails 300 and 302, respectively, and slot 800 (FIG. 8) and antenna 700 (FIG. 8) are positioned within recesses 306 and 308, respectively. Next, portable electronic device 600 is slid toward first end 151 until catch 188 engages slot 800. Here, guide rails 300 and 302 and recesses 306 and 308 assist in keeping portable electronic device 600 aligned and positioned properly within holder 100. This movement is maintained until latching mechanism 104 is taken from the non-extended position (FIG. 3) to the extended position (FIG. 4). Next, front edge 610 of portable electronic device 600 is tilted downwardly such that bottom surface 608 lies parallel to and abuts top surface 112. Finally, side edges 613 and 615 are released (or gripped less firmly) so that latching mechanism 104 urges portable electronic device 600 towards second end 153 until front edge 610 and a portion of top surface 606 is disposed and held within cup 304 (FIG. 9). When front edge 610 is directed within cup 304, electrical contacts of electrical connector 624 electrically couple with electrical contacts of connector head 103. Latching mechanism 104 maintains a sufficient force upon back edge 611 to securely maintain portable electronic device 600 within holder 100 and also to securely maintain the electrical connection between electrical connectors 101 and 624.

To remove portable electronic device 600 from holder 100, a reverse of the insertion method described above is used. Portable electronic device 600 is gripped firmly by side edges 613 and 615. Next, portable electronic device 600 is moved along guide rails 300 and 302 until front edge 610 is positioned outside of cup 304 and latching mechanism 104 is placed in the extended position (FIG. 4). Next, portable electronic device 600 is tilted upwards such that front edge 610 overcomes cup 304. Finally, portable electronic device 600 is moved away from first end 151 so that slot 800 disengages catch 188.

To emphasize the simplicity of operation, the following summary description is provided. For insertion, portable electronic device 600 is slid along top surface 112 until slot 800 engages catch 188 and latching mechanism 104 is placed in the extended position, tilted so that bottom surface 608 abuts top surface 112, and released so that front edge 610 inserts into cup 304 by the force of latching mechanism 104. For removal, portable electronic device 600 is slid along top surface 112 to place latching mechanism 104 in the extended position, tilted so that front edge 610 is raised above top surface 112, and moved away from first end 151 so that slot 800 disengages catch 188.

Preferably, mountable housing 102 is sized and shaped to accommodate a second portable electronic device (not shown). The second portable electronic device is designed and shaped similarly to portable electronic device 600, but sized slightly smaller in length and width. Here, top surface 112 and guide rails 300 and 302 are capable of retaining and guiding the second portable electronic device.

Thus, a user may conveniently insert and remove portable electronic device 600 (and other models of portable electronic device 600) within and from holder 100 using only one hand. During such insertion and removal, the user does not need to touch any portion of holder 100 itself. Given the shape of top surface 112, the user may easily insert or remove portable electronic device 600 without attentively viewing, if at all viewing, holder 100. The simple method provided by holder 100 increases safety if and when a user unwisely attempts to insert or remove portable electronic device 600 while driving. When portable electronic device 600 is inserted therein, holder 100 holds portable electronic device 600 securely and establishes and maintains a solid electrical connection between electrical connectors 101 and 624. A secure and reliable connection is necessary since holder 100 is typically mounted in an automobile which subjects holder 100 to sharp and sudden movements and vibrations.

While particular embodiments of the present invention have been shown and described, modifications may be made. For example, although latching mechanism 104 is shown specifically to engage slot 800, holder 100 may be designed to engage any portion of back edge 611 of portable electronic device 600. It is therefore intended in the appended claims to cover all such changes and modifications which fall within the true spirit and scope of the invention.

What is claimed is:

1. A holder for a portable electronic device, comprising:
   a mountable housing, said mountable housing having a first end and a second end;
   a latching mechanism, said latching mechanism slidably disposed near said first end, said latching mechanism slidably movable away from said second end to an extended position and toward said second end to a non-extended position;
   a biasing element, said biasing element configured to bias said latching mechanism with a force toward said second end;
   a catch portion of said latching mechanism, said catch portion positioned near said first end at a top surface of said mountable housing, said catch portion configured to engage a portion of the portable electronic device for retaining the portable electronic device between said catch portion and said second end, said catch portion and said second end defining boundaries of an area in which the portable electronic device is movable on said holder, the area being enlarged when said latch mechanism is in the extended position; and first electrical contacts, said first electrical contacts positioned at said second end and directed toward said first end, said first electrical contacts configured to engage second electrical contacts of the portable electronic device.

2. The holder according to claim 1, wherein said top surface defines a plane upon which the portable electronic device is movable on said holder, the plane being enlarged when said latching mechanism is in the extended position.

3. The holder according to claim 1, wherein said latching mechanism is configured to extend away from said second end when the portable electronic device is positioned along said top surface away from said second end.

4. The holder according to claim 1, wherein said housing further includes a cup positioned at said second end, said latching mechanism configured to move a portion of the portable electronic device in said cup upon receiving the portable electronic device.

5. The holder according to claim 1, wherein said holder comprises a hangup cup configured to receive a portable electronic device comprising a radiotelephone.

6. A hangup cup for a portable radiotelephone, said hangup cup comprising:

a mountable housing, said mountable housing having a top surface, a first end, a second end, a first side edge, and a second side edge, said mountable housing including a cup positioned at said second end, said cup having an opening facing said first end, said mountable housing having a first guide rail along said first side edge and a second guide rail along said second side edge;

a first electrical connector, said first electrical connector positioned at said second end and having electrical contacts directed toward said first end, said first electrical connector configured to engage a second electrical connector of the portable radiotelephone; and a latching mechanism, said latching mechanism slidably mounted below said top surface and having a catch positioned at or above said top surface around a portion of said first end, said latching mechanism slidably movable away from said second end to an extended position and toward said second end to a non-extended position, said latching mechanism including a biasing element to bias said latching mechanism with a force toward said second end, said catch configured to engage a portion of the portable radiotelephone for retention between said catch and said second end.

7. The hangup cup according to claim 6, wherein said latching mechanism is configured so that, when the portable radiotelephone is retained between said catch and said second end and thereafter repositioned along said top surface away from said second end, said latching mechanism is moved to the extended position.

8. The hangup cup according to claim 6, wherein said hangup cup provides for a single-handed insertion and removal of the portable radiotelephone without requiring additional contact with said hangup cup.

9. A holder for a portable electronic device, said holder comprising: a housing, said housing having a first end and a second end, said first end including a latching mechanism movably connected to said second end, said latching mechanism linearly movable away from said second end to a first position and toward said second end to a second position;

a biasing element, said biasing element configured to bias said latching mechanism with a force toward said second end;

a first electrical connector, said first electrical connector carried on said second end, said first electrical connector having electrical contacts exposed toward said first end, said first electrical connector configured to connect with a second electrical connector of the portable electronic device, and a catch of said latching mechanism, said catch adapted to engage a portion of the portable electronic device for retaining the portable electronic device between said catch and said second end, said latching mechanism configured to move from the second position to the first position when the portable electronic device is retained on said holder and displaced directly away from said second end towards said first end, said latching mechanism configured to retract from the first position to the second position when the portable electronic device is released in the first position to thereby displace the portable electronic device toward said second end for retention.

10. The holder according to claim 9, wherein said housing defines a top surface between said first and said second ends.

11. The holder according to claim 9, wherein said holder comprises a hangup cup and the portable electronic device comprises a portable radiotelephone.

12. The holder according to claim 9, wherein said biasing element comprises at least one spring.

13. The holder according to claim 9, further comprising:

a cup integrally defined on said housing on said second end, said cup having an opening configured to surround a portion of the portable electronic device when retained.

14. The holder according to claim 9, wherein said biasing element comprises at least one spring, said holder further comprising:

a top surface defined by said housing;

a first guide rail defined along a first side edge of said top surface;

a second guide rail defined along a second side edge of said top surface; and a cup positioned on said housing on said second end, said cup having an opening configured to surround a portion of the portable electronic device when retained.

15. The holder according to claim 9, further comprising:

a connector cord, said connector cord including a first cord, a second cord, and said first electrical connector, said first cord separate and apart from said second cord, said first cord adapted to carry radio frequency (RF) signals and said second cord adapted to carry audio signals for said portable electronic device.

16. A hangup cup for a portable radiotelephone, comprising:

a mountable housing, said mountable housing defining a first end, a second end, and a top surface, said top surface positioned between said first and said second ends, said second end defining a cup with an opening exposed toward said first end;

a first electrical connector, said first electrical connector positioned on said second end and including electrical contacts exposed toward said first end, said first electrical connector configured to connect with a second electrical connector of the portable radiotelephone; and a latching mechanism, said latching mechanism movably disposed on said first end, said latching mechanism linearly movable away from said second end to a first position and toward said second end to a second position, said latching mechanism including a biasing element to bias said latching mechanism with a force toward said second end, said latching mechanism including a catch to engage a portion of the portable radiotelephone for retention between said catch and said second end, said latching mechanism configured to extend to the first position when the portable radiotelephone is engaged with said catch and displaced over said top surface directly toward said first end, said latching mechanism configured to thereafter retract to the second position to urge the portable radiotelephone over said top surface through said opening of said cup for retention.

17. The hangup cup according to claim 16, wherein said biasing element comprises at least one spring.

18. The hangup cup according to claim 16, further comprising:

a connector cord, said connector cord including a first cord, a second cord, and said first electrical connector, said first cord separate and apart from said second cord, said first cord adapted to carry radio frequency (RF) signals and said second cord adapted to carry audio signals for said portable radiotelephone.

* * * * *